United States Patent
Yerramalli et al.

(10) Patent No.: US 12,177,896 B2
(45) Date of Patent: Dec. 24, 2024

(54) PROXY SENSING-BASED CHANNEL ACCESS FOR SHARED SPECTRUM

(71) Applicant: QUALCOMM Incorporated, San Diego, CA (US)

(72) Inventors: Srinivas Yerramalli, Hyderabad (IN); Arumugam Chendamarai Kannan, San Diego, CA (US); Vinay Chande, San Diego, CA (US); Jing Sun, San Diego, CA (US); Xiaoxia Zhang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 17/198,811

(22) Filed: Mar. 11, 2021

(65) Prior Publication Data

US 2021/0298073 A1    Sep. 23, 2021

Related U.S. Application Data

(60) Provisional application No. 62/990,843, filed on Mar. 17, 2020.

(51) Int. Cl.
*H04W 74/08* (2024.01)
*H04W 16/14* (2009.01)
*H04W 74/0808* (2024.01)

(52) U.S. Cl.
CPC ....... *H04W 74/0808* (2013.01); *H04W 16/14* (2013.01)

(58) Field of Classification Search
None
See application file for complete search history.

(56) References Cited

U.S. PATENT DOCUMENTS

| | | | | |
|---|---|---|---|---|
| 2011/0250916 | A1* | 10/2011 | Li | H04W 28/18 455/509 |
| 2014/0029585 | A1* | 1/2014 | Freda | H04W 16/14 370/336 |
| 2015/0365830 | A1* | 12/2015 | Wei | H04W 24/10 370/280 |
| 2016/0249227 | A1* | 8/2016 | Liang | H04W 52/243 |
| 2016/0338054 | A1* | 11/2016 | Oh | H04W 74/0841 |
| 2017/0188241 | A1* | 6/2017 | Mueck | H04W 72/0453 |

(Continued)

*Primary Examiner* — Jason E Mattis
*Assistant Examiner* — Bao G Nguyen
(74) *Attorney, Agent, or Firm* — Norton Rose Fullbright US LLP

(57) ABSTRACT

A proxy sensing-based channel access procedure is discussed for shared spectrum networks. Within a given network, a distribution of proxy nodes may be deployed around a network operating area. A control node, which controls the proxy sensing mode for the network, may configure the active network nodes to conduct communications via the shared communication spectrum without first performing any type of channel sensing on the shared communication spectrum. The control node may then also configured the proxy nodes to perform channel sensing on the shared spectrum for the entire network. Using the reported channel sense results from the proxy nodes, the control node may determine whether detected interference is occasional or persistent, and whether to take some action to modify the communications or operations of the network.

52 Claims, 8 Drawing Sheets

(56) References Cited

U.S. PATENT DOCUMENTS

| | | | | |
|---|---|---|---|---|
| 2018/0152918 A1* | 5/2018 | Green | ................... | G01S 7/021 |
| 2019/0268933 A1* | 8/2019 | Sun | ................... | H04W 74/0816 |
| 2020/0314803 A1* | 10/2020 | Zhang | ................ | H04W 72/042 |
| 2020/0314906 A1* | 10/2020 | Goyal | ................ | H04B 7/0695 |

* cited by examiner

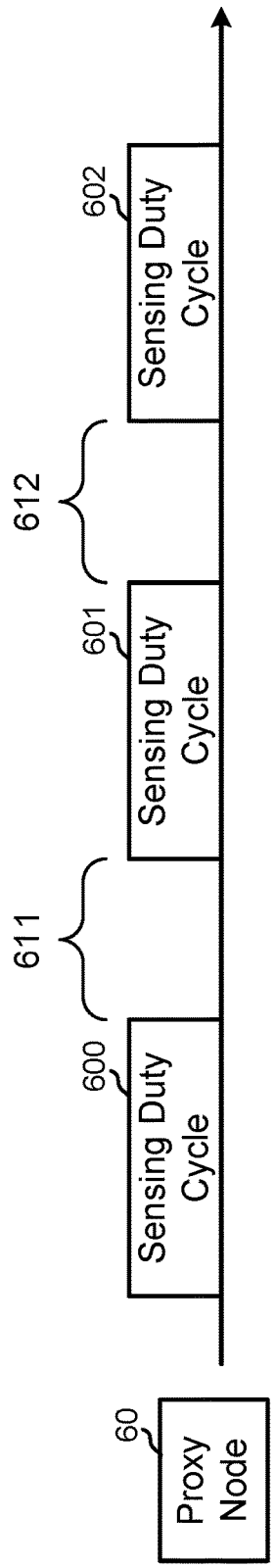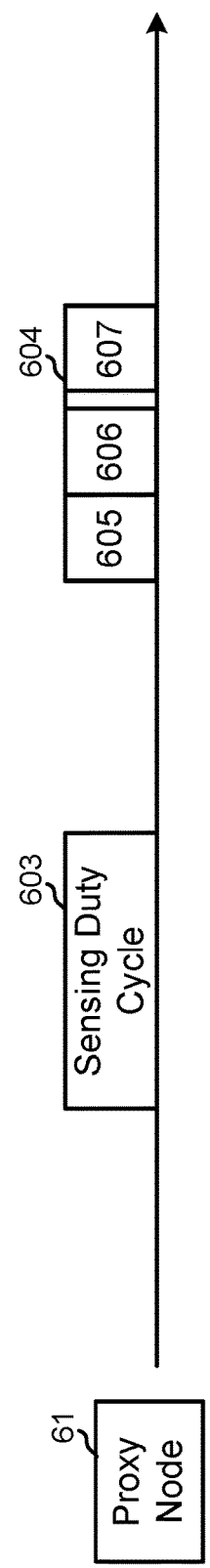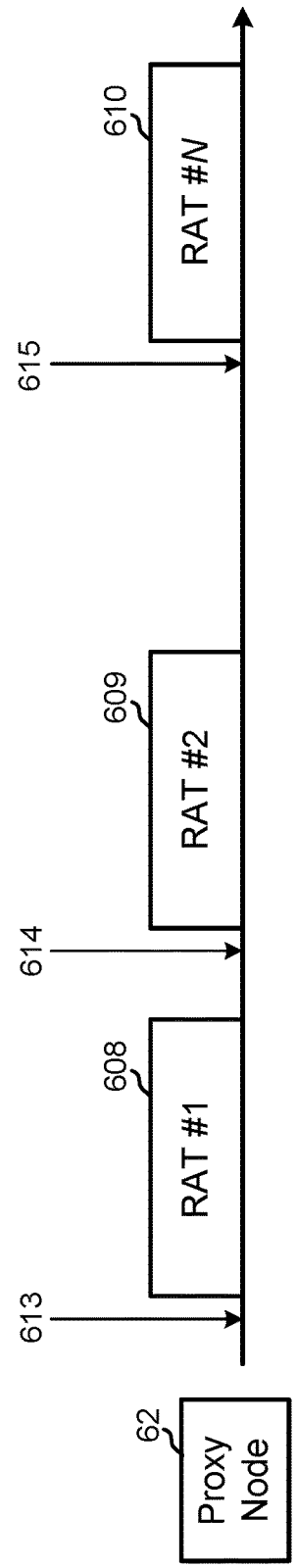

PROXY SENSING-BASED CHANNEL ACCESS FOR SHARED SPECTRUM

CROSS-REFERENCE TO RELATED APPLICATIONS

This application claims the benefit of U.S. Provisional Patent Application Ser. No. 62/990,843, entitled, "PROXY SENSING-BASED CHANNEL ACCESS FOR SHARED SPECTRUM," filed on Mar. 17, 2020, which is expressly incorporated by reference herein in its entirety.

BACKGROUND

Field

Aspects of the present disclosure relate generally to wireless communication systems, and more particularly, to proxy sensing-based channel access for shared spectrum deployments.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes identifying, by a control node, a first distribution of a plurality of proxy devices around a network operating area of a shared communication spectrum, configuring, by the control node, a plurality of network nodes within the network operating area to conduct communications via the shared communication spectrum without first performing channel sensing on the shared communication spectrum, and configuring, by the control node, the plurality of proxy devices to perform channel sensing on the shared communication spectrum.

In an additional aspect of the disclosure, a method of wireless communication includes receiving, by a proxy node, a sense configuration message from a control node to perform channel sensing on a shared communication spectrum, performing, by the proxy node, the channel sensing on the shared communication spectrum according to network parameters received in the sense configuration message, and transmitting, by the proxy node, a channel sense report including results of the channel sensing.

In an additional aspect of the disclosure, an apparatus configured for wireless communication includes means for identifying, by a control node, a first distribution of a plurality of proxy devices around a network operating area of a shared communication spectrum, means for configuring, by the control node, a plurality of network nodes within the network operating area to conduct communications via the shared communication spectrum without first performing channel sensing on the shared communication spectrum, and means for configuring, by the control node, the plurality of proxy devices to perform channel sensing on the shared communication spectrum.

In an additional aspect of the disclosure, an apparatus configured for wireless communication includes means for receiving, by a proxy node, a sense configuration message from a control node to perform channel sensing on a shared communication spectrum, means for performing, by the proxy node, the channel sensing on the shared communication spectrum according to network parameters received in the sense configuration message, and means for transmitting, by the proxy node, a channel sense report including results of the channel sensing.

In an additional aspect of the disclosure, a non-transitory computer-readable medium having program code recorded thereon. The program code further includes code to identify, by a control node, a first distribution of a plurality of proxy devices around a network operating area of a shared communication spectrum, code to configure, by the control node, a plurality of network nodes within the network operating area to conduct communications via the shared communication spectrum without first performing channel sensing on the shared communication spectrum, and code to configure, by the control node, the plurality of proxy devices to perform channel sensing on the shared communication spectrum.

In an additional aspect of the disclosure, a non-transitory computer-readable medium having program code recorded thereon. The program code further includes code to receive, by a proxy node, a sense configuration message from a control node to perform channel sensing on a shared communication spectrum, code to perform, by the proxy node, the channel sensing on the shared communication spectrum according to network parameters received in the sense configuration message, and code to transmit, by the proxy node, a channel sense report including results of the channel sensing.

In an additional aspect of the disclosure, an apparatus configured for wireless communication is disclosed. The apparatus includes at least one processor, and a memory coupled to the processor. The processor is configured to identify, by a control node, a first distribution of a plurality of proxy devices around a network operating area of a shared communication spectrum, to configure, by the control node, a plurality of network nodes within the network operating area to conduct communications via the shared communication spectrum without first performing channel sensing on the shared communication spectrum, and to configure, by the control node, the plurality of proxy devices to perform channel sensing on the shared communication spectrum.

In an additional aspect of the disclosure, an apparatus configured for wireless communication is disclosed. The apparatus includes at least one processor, and a memory coupled to the processor. The processor is configured to receive, by a proxy node, a sense configuration message from a control node to perform channel sensing on a shared communication spectrum, to perform, by the proxy node, the channel sensing on the shared communication spectrum according to network parameters received in the sense configuration message, and to transmit, by the proxy node, a channel sense report including results of the channel sensing.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 6A-6C are block diagrams illustrating sensing duty cycles for proxy nodes, configured according to aspects of the present disclosure.

DETAILED DESCRIPTION

Figure 1:
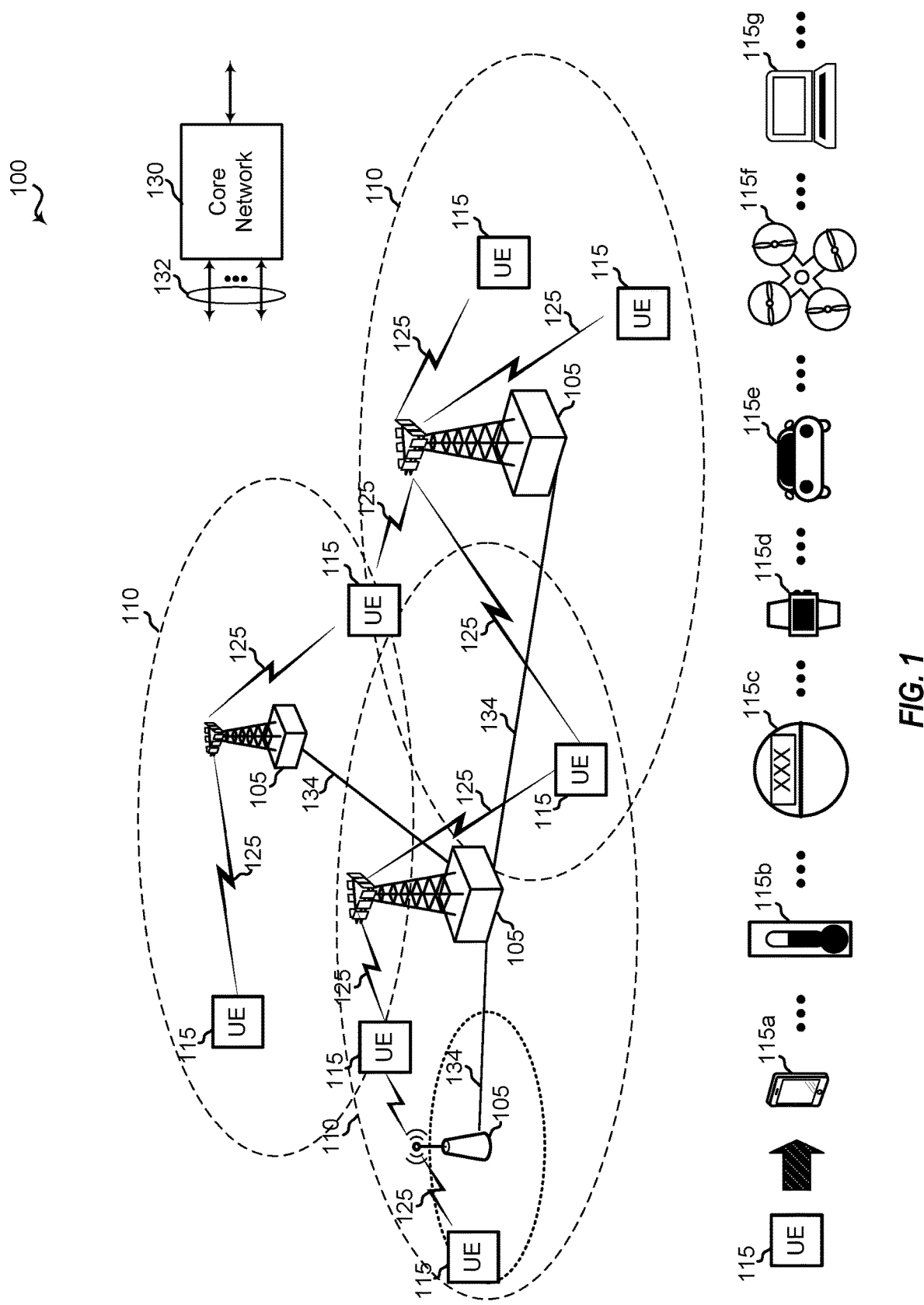
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHZ, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating an example of a wireless communications system 100 that supports implementation of a set of proxy nodes scattered both throughout the network and outside of network coverage in accordance with aspects of the present disclosure. For purposes of the described example aspect, wireless communication system 100 may operate in a millimeter wave (mmW) frequency, such as in frequency range 2 (FR2) of a new radio-unlicensed (NR-U) network. Host network nodes that facilitate communications within wireless communication system 100 may perform communications without first performing channel sensing via a listen before talk (LBT) procedure. Instead, the proxy nodes that make up the proxy node network within wireless communication system 100 perform channel sensing across the coverage area to report any detected interference to core network 130. Core network 130 may then take various steps in response to the reported interference. The host network among wireless communications system 100 includes base stations 105, UEs 115, and core network 130. The proxy nodes may be either selected or dedicated installations of base stations 105 or UEs 115.

In some additional examples, the wireless communications system 100 may be a Long Term Evolution (LTE) network, an LTE-Advanced (LTE-A) network, an LTE-A Pro network, or NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be referred to as forward link transmissions while uplink transmissions may also be referred to as reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and, therefore, provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-things (NB-IOT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone (UE 115a), a personal digital assistant (PDA), a wearable device (UE 115d), a tablet computer, a laptop computer (UE 115g), or a personal computer. In some examples, a UE 115 may also refer to a wireless local loop (WLL) station, an Internet-of-things (IOT) device, an Internet-of-everything (IoE) device, an MTC device, or the like, which may be implemented in various articles such as appliances, vehicles (UE 115e and UE 115f), meters (UE 115b and UE 115c), or the like.

Some UEs 115, such as MTC or IoT devices, may be low cost or low complexity devices, and may provide for automated communication between machines (e.g., via machine-to-machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In other cases, UEs 115 may be designed to support critical functions (e.g., mission critical functions), and a wireless communications system 100 may be configured to provide ultra-reliable communications for these functions.

In certain cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 may facilitate the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one packet data network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP multimedia subsystem (IMS), or a packet-switched (PS) streaming service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHZ, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

Wireless communications system 100 may include operations by different network operating entities (e.g., network operators), in which each network operator may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In various implementations, wireless communications system 100 may use both licensed and unlicensed radio frequency spectrum bands. For example, wireless communications system 100 may employ license assisted access (LAA), LTE-unlicensed (LTE-U) radio access technology, or NR technology in an unlicensed band (NR-U), such as the 5 GHz ISM band. In some cases, UE 115 and base station 105 of the wireless communications system 100 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available.

A CCA may include an energy detection procedure to determine whether there are any other active transmissions on the shared channel. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include message detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-µs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In wireless communications system 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In certain implementations, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In additional cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot, while in other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier," as may be used herein, refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHZ). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In certain instances, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum, such as NR-shared spectrum (NR-SS)). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In additional cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHZ, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Figure 2:
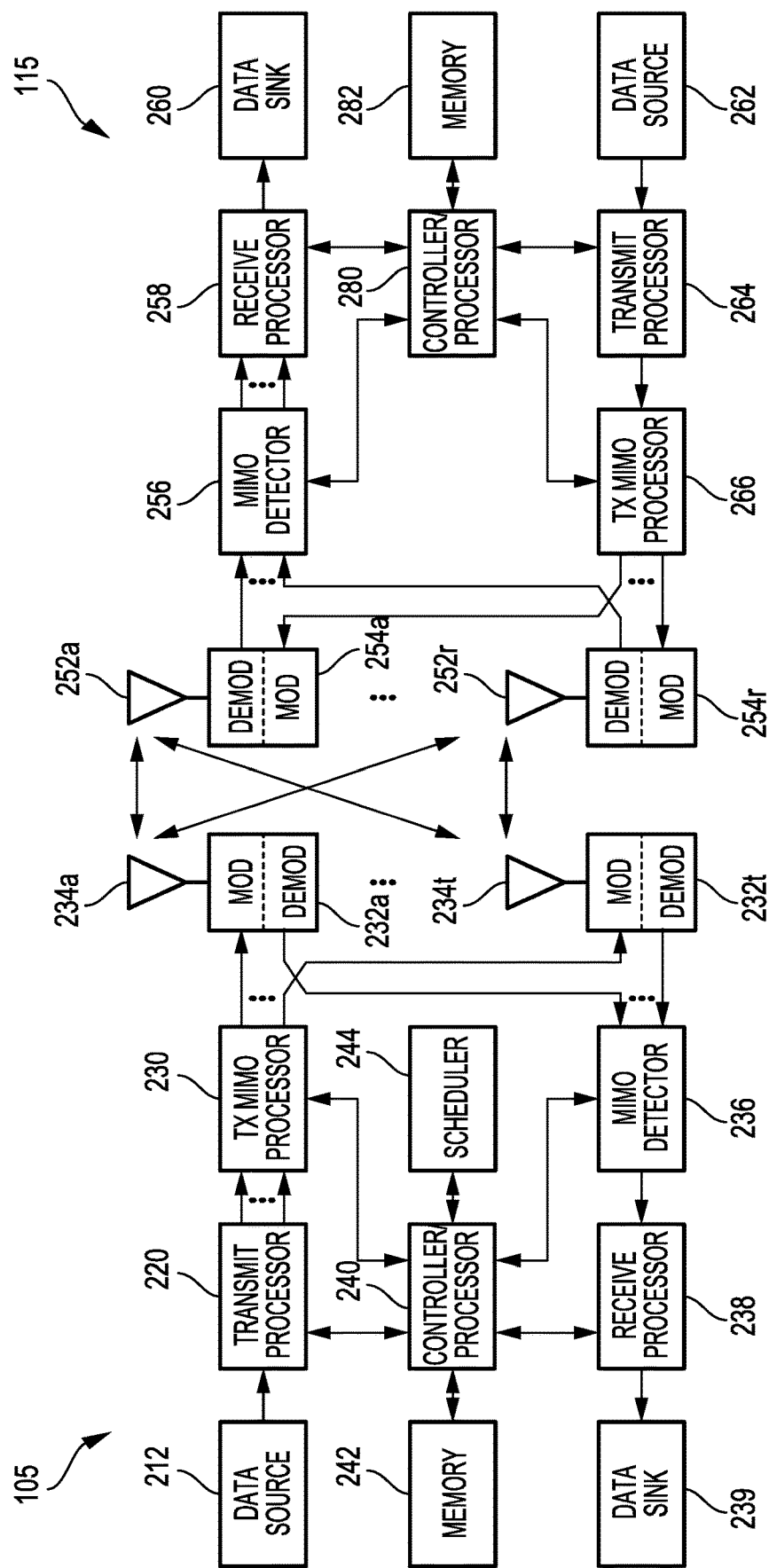
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 3A and 3B, and/or other processes for the techniques described herein. The memories 242 and 282 may store data and program codes for the base station 105 and the UE 115, respectively. A scheduler 244 may schedule UEs for data transmission on the downlink and/or uplink.

In systems with contention based channel access, it is generally expected that the node which is performing the transmission performs the channel sensing. This is expected for sub-7 GHz bands where there is a high probability of interference with other devices and radio access technologies, especially when transmissions are asynchronous in nature. However, in higher frequency bands such as mmW bands, the probability of multiple operators being deployed in the same spectrum and actively interfering which each other is much less likely. Even if interference is present in such mmW bands, the impact of interference may also smaller. In accordance therewith, various aspect of the present disclosure are directed to defining a mode in which many of the nodes in the network (the "host network") do not perform any channel sensing before performing communications, while a small set of nodes in and around the network (the "proxy network") performs channel sensing or are dedicated to listening for interferers. This proxy sensing mode may be initiated when interference is detected in a nearby area. Thus, where the host network nodes may initially operate without channel sensing in the shared communication spectrum, if any interference is detected, the proxy sensing mode according to the various aspects described herein may be triggered.

It should be noted that channel sensing may be performed via a listen before talk (LBT) procedure, a clear channel assessment (CCA) procedure, or other procedure in which the shared communication spectrum is monitored for either specific signals (e.g., preambles, synchronization signal blocks (SSBs), request-to-send (RTS)/clear-to-send (CTS), and the like) or a signal energy that exceeds a predetermined threshold (via energy detection (ED)). Such channel sensing may detect such signals or energy that results in interference with the network communications of the host network.

Figures 3A, 3B:
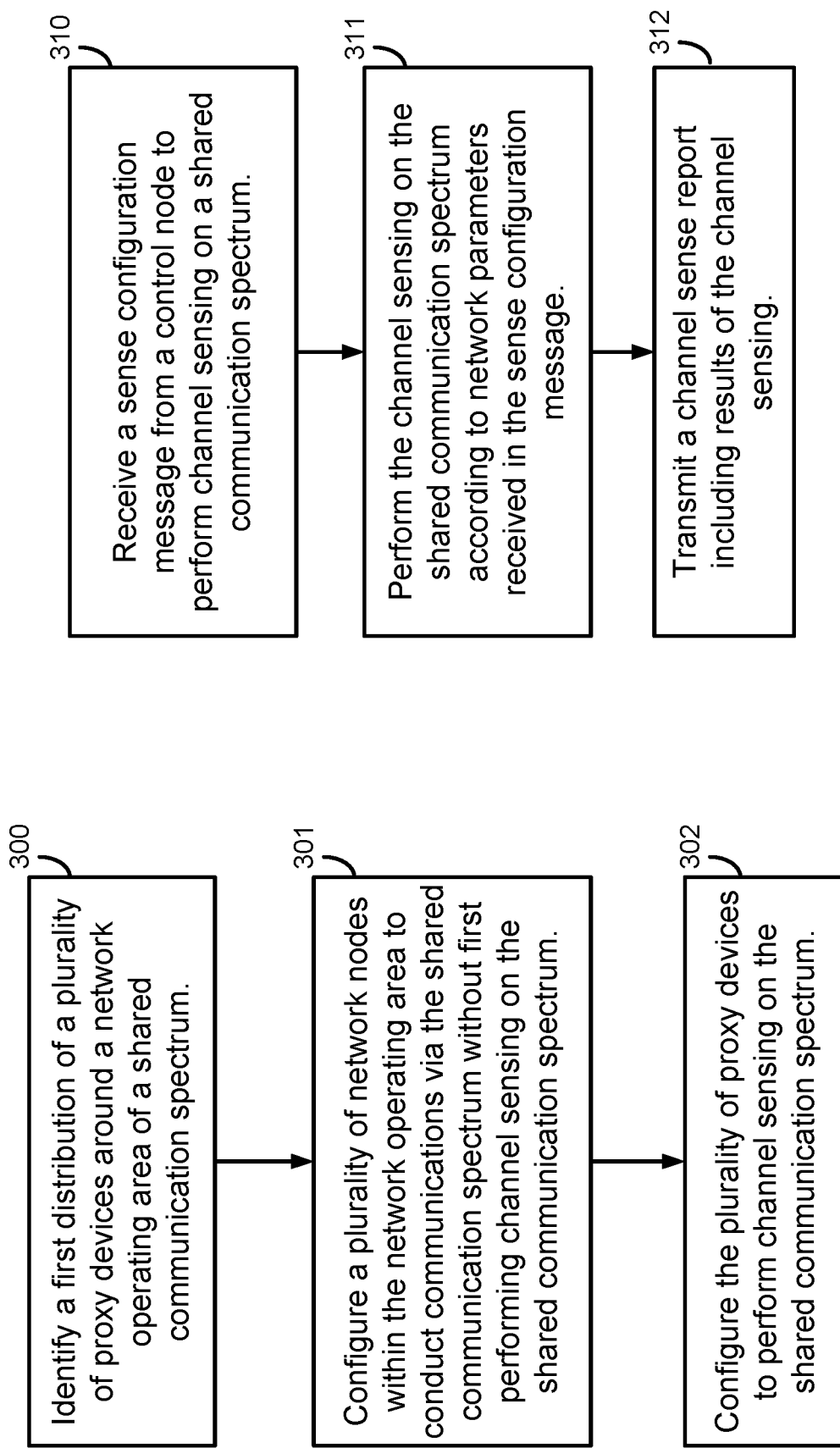
FIGS. 3A and 3B are block diagrams illustrating example blocks executed to implement aspects of the present disclosure.
Figure 7:
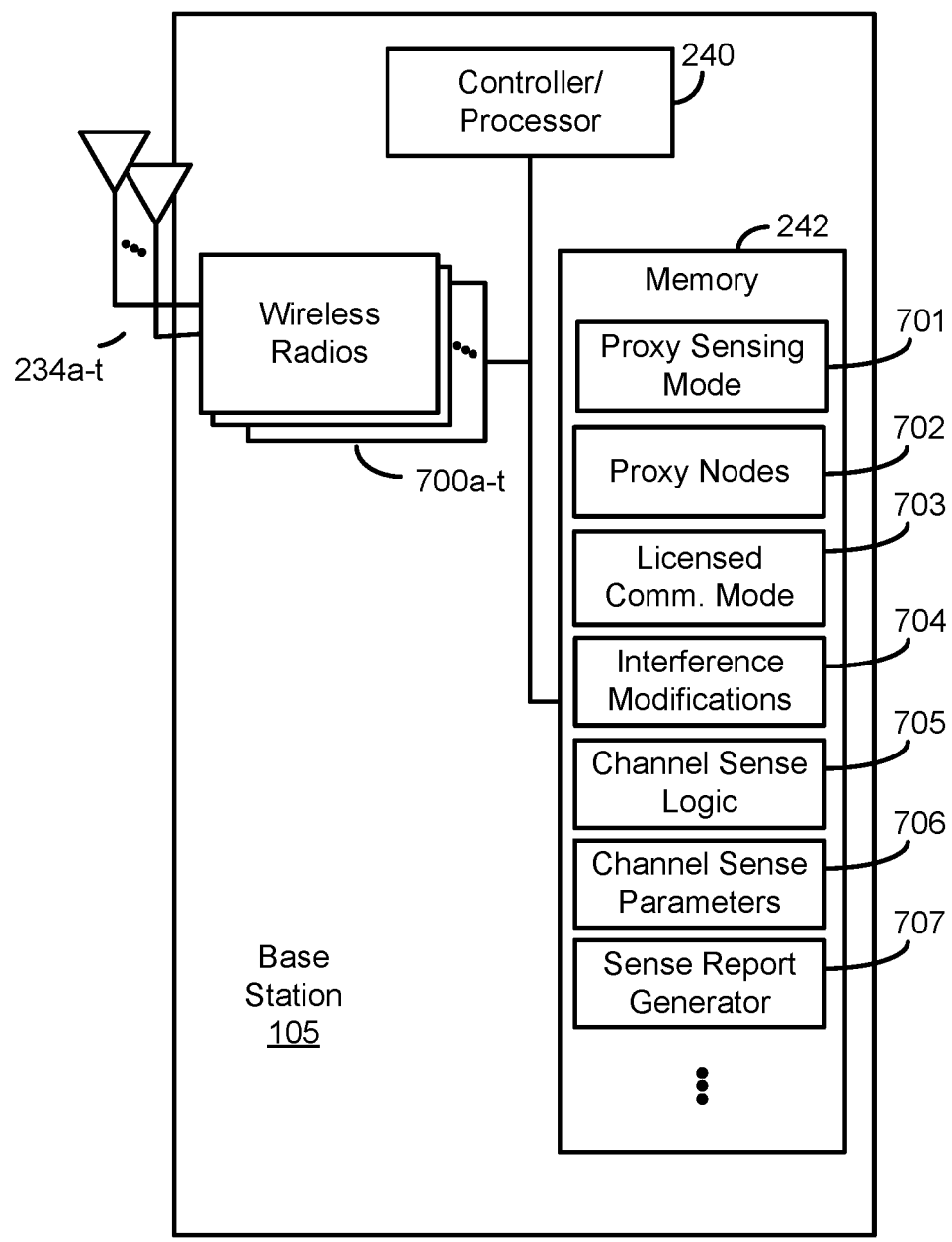
FIG. 7 is a block diagram illustrating a base station configured according to one aspect of the present disclosure.

FIG. 3A is a block diagram illustrating example blocks executed to implement one aspect of the present disclosure. The example blocks will also be described with respect to base station 105 as illustrated in FIGS. 2 and 7. FIG. 7 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 700*a-t* and antennas 234*a-t*. Wireless radios 700*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 300, a control node identifies a first distribution of a plurality of proxy devices around a network operating area of a shared communication spectrum. A control node may be implemented via a base station, such as base station 105. In order to trigger the proxy sensing mode, base station 105, under control of controller/processor 240, executes proxy sensing mode 701, stored in memory 242. The functionalities and features resulting from the execution of the steps and instructions of proxy sensing mode 701 (referred to herein as the "execution environment" of proxy sensing mode 701), provides base station 105 the functionality to identify and manage the set of proxy nodes. The design of the proxy network may be provided to base station 105 by the network with the identified nodes stored in memory 242 at proxy nodes 702. In certain aspects of the present disclosure, the proxy sensing mode may be triggered when interference is detected in an area near the network coverage area of the control node, base station 105. Upon detection of this interference, base station 105 would then execute proxy sensing mode 701.

At block 301, the control node configures a plurality of network nodes within the network operating area to conduct communications via the shared communication spectrum without first performing channel sensing on the shared communication spectrum. The communication network associated with the control node, base station 105, includes a number of operational nodes, such as base stations and UEs, providing communication over the shared communication spectrum (the host network). Base station 105, within the execution environment of proxy sensing mode 701, would execute, under control of controller/processor 240, licensed communication mode 703. The execution environment of licensed communication mode 703, allows base station 105 to signal each of the host network nodes to operate according to the licensed communication mode, in which each such host network node does not perform channel sensing before performing communications. Base station 105 would signal each of the host network nodes via wireless radios 700*a-t* and antennas 234*a-t*.

At block 302, the control node configures the plurality of proxy devices to perform channel sensing on the shared communication spectrum. Within the execution environment of proxy sensing mode 701, base station 105 will signal the proxy nodes to initiate the proxy sensing mode. The configuration signals include sensing parameters for the proxy nodes to use in performing such channel sensing. For example, the sensing parameters may set the frequency and length of a channel sensing duty cycle, a network bandwidth, specified channels to monitor for, specified radio access technologies for sensing, and the like. Base station 105 transmits this channel sensing configuration to the proxy nodes via wireless radios 700*a-t* and antennas 234*a-t*.

Figure 8:
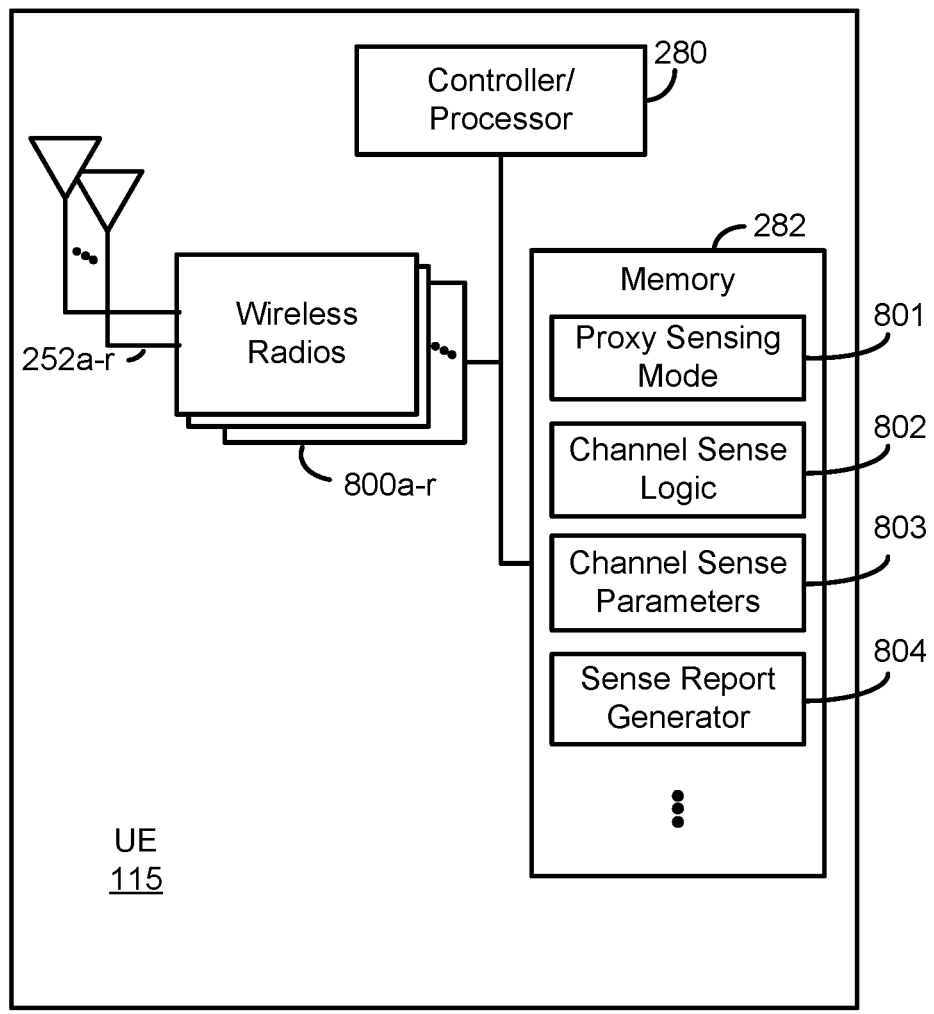
FIG. 8 is a block diagram illustrating a UE configured according to one aspect of the present disclosure.

FIG. 3B is a block diagram illustrating example blocks executed by a proxy node to implement one aspect of the present disclosure. Proxy nodes may be either base stations or UEs. Thus, the example blocks will also be described with respect to base station 105 as illustrated in FIGS. 2 and 7, and to UE 115 as illustrated in FIGS. 2 and 8. FIG. 8 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 800*a-r* and antennas 252*a-r*. Wireless radios 800*a-r* includes various components and hardware, as illustrated in FIG. 2 for UE 115, including modulator/demodulators 254*a-r*, MIMO detector 256, receive processor 258, transmit processor 264, and TX MIMO processor 266.

At block 310, a proxy node receives a sense configuration message from a control node to perform channel sensing on a shared communication spectrum. A proxy node may be implemented by dedicated proxy devices or by operational network nodes that are assigned to perform the proxy sensing functionality. Such devices or nodes may include base stations or UEs. When implemented by a base station, such as base station 105, base station 105 would receive the proxy sensing configuration message from a control node via antennas 234*a-t* and wireless radios 700*a-t*. The proxy sensing configuration message may contain channel sensing parameters, as noted above, that are stored in memory 242 at channel sense parameters 706. The proxy sensing configuration message may also include a trigger for proxy nodes to initiate the proxy sensing mode. In response to this trigger, base station 105, under control of controller/processor 240, executes proxy sensing mode 701 in memory 242. The execution environment of proxy sensing mode 701 allows base station 105 to operate as a proxy node for the host network.

When the proxy node is implemented by a UE, such as UE 115, UE 115 would receive the proxy sensing configuration message from a control node via antennas 252*a-r* and wireless radios 800*a-r*. As noted above, the proxy sensing configuration message may contain channel sensing parameters that are stored in memory 282 at channel sense parameters 803. The proxy sensing configuration message may also include a trigger for proxy nodes to initiate the proxy sensing mode. In response to this trigger, UE, under control of controller/processor 280, executes proxy sensing mode 801 in memory 282. The execution environment of proxy sensing mode 801 allows UE 115 to operate as a proxy node for the host network.

At block 311, the proxy node performs the channel sensing on the shared communication spectrum according to network parameters received in the sense configuration message. When implemented via base station 105, within the execution environment of proxy sensing mode 701, base station 105 will perform channel sensing procedures on the shared communication spectrum according to the parameters in channel sense parameters 706. Base station 105, under control of controller/processor 240, executes channel sense logic 705. The execution environment of channel sense logic 705 provides base station 105 the functionality to perform various types of channel sensing procedures, such as listen before talk (LBT) procedures, clear channel assessments (CCAs), and the like. As indicated, the sensing parameters are used by the execution environment of channel sense logic 705 to indicate when and how base station 105 will conduct the channel sensing, as well as whether base station 105 will detect for other radio access technologies, whether alone or with the sensing for other capable technologies as well.

When the proxy node is implemented by UE 115, within the execution environment of proxy sensing mode 801, UE 115 performs channel sensing procedures on the shared communication spectrum according to the parameters in channel sense parameters 803. UE 115, under control of controller/processor 280, executes channel sense logic 802. As indicated above, the execution environment of channel sense logic 802 provides UE 115 the functionality to perform various types of channel sensing procedures, such as LBT procedures, CCAs, and the like. As indicated, the sensing parameters are used by the execution environment of channel sense logic 802 to indicate when and how UE 115 will conduct the channel sensing, as well as whether UE 115 will detect for other radio access technologies, whether alone or with the sensing for other capable technologies as well.

At block 312, the proxy node transmits a channel sense report including results of the channel sensing. When implemented via base station 105, further within the execution environment of proxy sensing mode 701, upon completion of a channel sensing procedure, base station 105 may execute, under control of controller/processor 240, sense report generator 707, in memory 242. The execution environment of sense report generator 707 provides base station 105 the functionality to generate a report that includes the results of the channel sense procedure. Base station 105 would then transmit the generated report to the control node via wireless radios 700*a-t* and antennas 234*a-t*.

When the proxy node is implemented by UE 115, further within the execution environment of proxy sensing mode 801, upon completion of a channel sensing procedure operated by channel sense logic 802, UE 115 may execute, under control of controller/processor 280, sense report generator 804, in memory 282. The execution environment of sense report generator 804 provides UE 115 the functionality to generate a report that includes the results of the channel sense procedure. UE 115 would then transmit the generated report to the control node via wireless radios 800*a-r* and antennas 252*a-r*.

Figure 4:
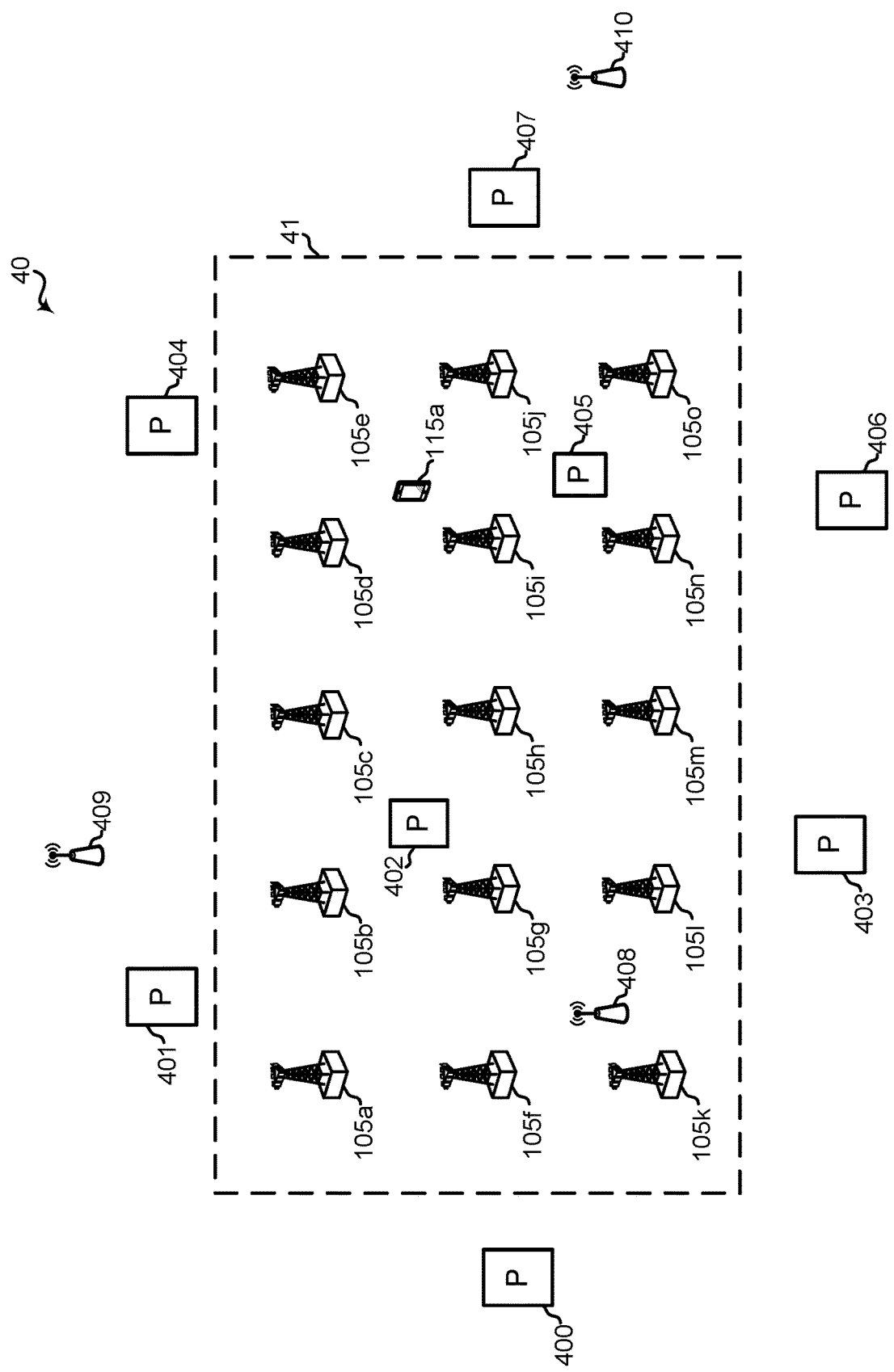
FIG. 4 is a block diagram illustrating an NR-U network configured for operations at FR2 with host network nodes and proxy nodes, each configured according to one aspect of the present disclosure.

FIG. 4 is a block diagram illustrating an NR-U network 40 configured for operations at FR2 with host network nodes, base stations 105*a-*105*o*, and proxy nodes 400-407, each configured according to one aspect of the present disclosure. NR-U network 40, with base stations 105*a-*105*o*, defines a coverage area 41, within which communications are maintained. According to the illustrated aspect, proxy nodes 400-407 are scattered inside and outside of coverage area 41. Proxy nodes 400, 401, 403, 404, 406, and 407, which are positioned outside of coverage area 41 may be located within a threshold distance from the boundary of coverage area 41 in order to detect interfering nodes that may have a greater effect on boundary nodes. Proxy nodes 400-407 may be configured to perform the function of channel sensing for all communications performed by the host network nodes, base stations 105*a-*105*o* and any available UEs, such as UE 115*a*. If any interference is detected by proxy nodes 400-407, which cannot be attributed to the operator of NR-U network 40, additional actions can be taken to mitigate the interference. The rest of the host network nodes 105*a-*105*o* and any available UEs, such as UE 115*a*, would not perform channel sensing but, instead, operate similarly to communications within a licensed spectrum (a "licensed communication mode").

The configurations for proxy nodes 400-407 and the host network nodes, base stations 105*a-*105*o*, may occur via a control node operating within NR-U network 40. A control node may be implemented by any of the host network nodes, base stations 105*a-*105*o*. Purely for purposes of an example, base station 105*h*, may operate as the control node for implementation of the proxy network illustrated in FIG. 4 and defined according to the various aspects of the present disclosure. In such example aspect, base station 105*h* would configure the host network nodes, including itself, base stations 105*a-*105*o*, to operate in a licensed communication mode, by performing communications without first performing a successful channel sensing. Base station 105*h* would further identify and configure a distribution of network nodes 400-407 as the proxy network to perform channel sensing for the host network nodes.

In one example deployment scenario, NR-U network 40 may be deployed within the 60 GHz mmW band. The bandwidth and waveform for NR-U network 40, as indicated in the example deployment scenario, do not match that of other potentially interfering nodes, such the Institute of Electrical and Electronics Engineers (IEEE) 802.11ad, 802.15 nodes, and the like. If channel sensing were to be performed by the host network nodes, base stations 105a-1050, it may be challenging for those nodes, operating in mismatched channel parameters, to detect interference from potentially interfering nodes of the different radio access technologies. Instead, some or all of proxy nodes 400-407 may be capable of detecting interference from different radio access technologies. If it is known that, in a given area, no other NR-U network would be deployed, some of the multi-radio access technology nodes of proxy nodes 400-407 may be scattered around coverage area 41. Thus, for example, if such ones of proxy nodes 400-407 persistently detect an IEEE 802.11ad preamble for a predefined period of time, then NR-U network 40 may understand that there is an interfering network active that may influence communications within coverage area 41 and implement appropriate coexistence protocols for addressing such interference. In one example response, the entire host network, base stations 105a-1050 and any available UEs, such as UE 115a, would switch to a coexistence mode.

According to the aspect illustrated in FIG. 4, proxy nodes 400-407 are configured to perform channel sensing on behalf of the whole of NR-U network 40. Each of proxy nodes 400-407 may be a base station, such as base station 105, or a UE, such as UE 115 (FIGS. 2 and 8). Additionally, any of proxy nodes 400-407 may be a dedicated proxy node, which may be configured with limited communication capabilities, but standard channel sensing capabilities for one or more radio access technologies, or regular operational nodes identified and configured to cease regular communication operations and begin performing channel sensing for NR-U network 40.

Proxy nodes 400-407 may detect interferers of the same technology, as NR-U network 40 (e.g., intra-technology coexistence) or can be configured to detect nodes of a different network technology (e.g., inter-technology coexistence). For example, for sensing IEEE 802.11ad devices, proxy nodes 400-407 can be configured to detect a preamble, request-to-send (RTS)/clear-to-send (CTS), data or control packets, or the like, that are associated with IEEE 802.11ad communications. Similarly, proxy nodes 400-407 can be configured to search on different center frequencies that overlap with the network operation of NR-U network 40. It should be noted that proxy nodes 400-407 can be configured for other physical channels, signals, or access technologies as well.

In implementing intra-technology coexistence with NR-U network 40, proxy nodes 400-407 may be configured to search for synchronization signal blocks (SSBs)/random access channels (RACH) on a set of raster frequencies specified by the host network. In order to distinguish communications of NR-U network 40, proxy nodes 400-407 may attempt to ignore signals from any of base stations 105a-1050 and any available UEs, such as UE 115a, in communications with base stations 105a-1050. NR-U network 40 uses a specific set of SSBs or access point (AP) or network identifiers (IDs). Proxy nodes 400-407 may find this information in the remaining minimum system information (RMSI) signals or may be configured with a list of SSBs or AP/network IDs to ignore. Each signal transmitted within the host network of NR-U network 40 (e.g., PDCCH, PUSCH, etc.) may carry a hashed or scrambled version of the network ID so that one or more of proxy nodes 400-407 may easily identify whether the received signal belongs to NR-U network 40 or an interfering network. When it belongs to NR-U network 40, proxy nodes 400-407 may ignore those detected signals and not identify them as interference.

Figure 5:
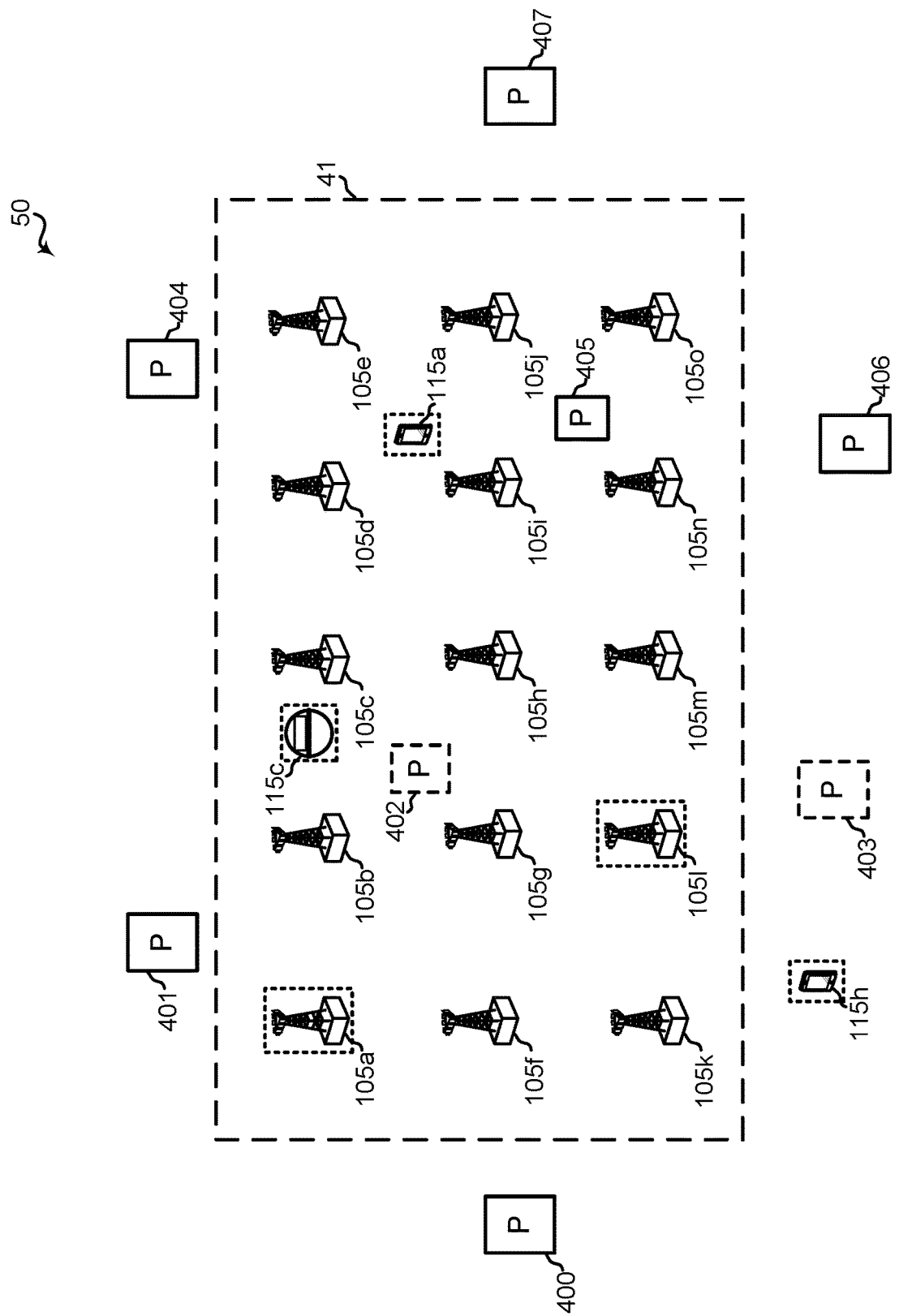
FIG. 5 is a block diagram illustrating a NR-U network, as presented in FIG. 4, configured according to another aspect of the present disclosure.

FIG. 5 is a block diagram illustrating NR-U network 40, as presented in FIG. 4, configured according to another aspect of the present disclosure. In order to achieve the desired performance, the distribution of proxy nodes 400-407 within the proxy network may be designed using a probability analysis when designing the configuration of NR-U network 40. An adequately distributed proxy network should detect a randomly located interferer within coverage area 41 with a probability higher than a pre-defined probability threshold. If, during the network design process for NR-U network 40, estimates or simulations indicate that the pre-defined probability threshold is not being met, the current design proposal for distribution of the proxy network of NR-U network 40 (FIG. 4) may be adjusted the distribution. While this process may occur at the network design stage, the illustrated representation of NR-U network 40 in FIG. 5 shows how the distribution may be changed in the design of the proxy network. For example, proxy nodes 402 and 403 may have shown little effectiveness of random signal detection, leading the designer to use active UEs, UEs 115a, 115c, and 115h, and active base stations 105a and 105l for proxy node duties.

Due to the directional nature of transmission, having proxy node base stations located near other host node base stations may not be sufficient to perform comprehensive interferer detection. However, where a UE, such as UEs 115a, 115c, and 115h play a role in detecting interference, then the chance of detection may be much higher. As noted in greater detail below, the control node may configure the proxy nodes, including UEs 115a, 115c, and 115h for a time duration or duty cycle for the UE to perform channel sensing. UEs 115a, 115c, and 115h would be configured not to transmit or receive any messages from a host network node during in this time period. The proxy nodes, including UEs 115a, 115c, and 115h, would perform channel sensing with parameters configured by the control node. If any of UEs 115a, 115c, and 115h has a capability to sense inter-technology interference, that UE may indicate this ability to NR-U network 40 via the control node. When determining the configuration of the channel sensing procedures, the control node would take account of which radio access technologies certain UEs, including UEs 115a, 115c, and 115h, may detect. As such, the control node may configured the proxy nodes, including UEs 115a, 115c, and 115h, to sense for signals from other technologies as well. All of the active proxy nodes of proxy nodes 400-407, UEs 115a, 115c, and 115h, and base stations 105a and 105c would transmit channel sense reports, which include the results of the channel sensing that occurs. NR-U network 40, via the control node, may collate the reports from all the nodes of the proxy network to determine whether there is an interfering network operating nearby.

FIGS. 6A-6C are block diagrams illustrating sensing duty cycles 600-604 and 608-610 for proxy nodes 60-62, respectively, configured according to aspects of the present disclosure. In the example aspect illustrated in FIG. 6A, proxy node 60 is configured with sensing duty cycles 600-602, in order to reduce the amount of power consumed by such nodes. When proxy node 60 is implemented as an active UE, sensing duty cycles 600-602 may operate similarly to a measurement gap. The UE implementing proxy node 60 would, therefore, be configured not to transmit or receive any communications during sensing duty cycles 600-602, while it performs channel sensing. The UE implementing proxy node 60 may perform regular communications during interim periods, such as communication activity periods 611 and 612.

In the example aspect illustrated in FIG. 6B, proxy node 61 may simultaneously detect for interference from different radio access technologies during sensing duty cycle 603. Alternatively, proxy node 61 may sense for different technologies in a time division multiplex (TDM) fashion. For example, within sensing duty cycle 604, proxy node 61 may sense for interference from a first radio access technology at 605, a second radio access technology at 606, and an $N^{th}$ radio access technology at 607.

In the example aspect illustrated in FIG. 6C, proxy node 62 detects for interference from different radio access technologies based on sensing duty cycles 608-610, which are offset from the expected periodicity of known control signals 613-615 of those technologies (e.g., beacon signals, SSB transmissions, and the like). This per-technology offset may be configured per proxy node to maximize coverage of the network coverage area.

Returning now to FIG. 4, the illustrated implementation of NR-U network 40 may provide illustration of additional aspects including network actions that may occur when interference is detected. As proxy nodes 400-407 of the proxy network for NR-U network 40 performs channel sensing of the shared mmW spectrum, proxy nodes 400-407 will transmit channel sense reports to the control node, such as, for example, base station 105g. As the control node, base station 105g analyzes the results from the channel sense reports and may determine whether there is interference and whether the interference is occasional or persistent. When interference is detected by the proxy network, control node may determine to modify operations in one of multiple different options. In a first optional implementation, base station 105g, as control node, may signal proxy nodes 400-407 to increase the frequency of the channel sensing or increase the number of physical channels monitored (e.g., PDCCH detection, PUSCH detection, etc.). The first optional implementation may be triggered when the channel sense reports indicate to the control node that occasional interference has been detected. By implementing an increase in frequency of sensing or the number of channels monitored, proxy nodes 400-407 may determine whether the detected interference is persistent or not.

In a second optional implementation, base station 105g, as control node, may signal the host network nodes, base stations 105a-105o, and any available active UEs (not shown) to enable a coexistence mode. In the coexistence mode, all host network nodes will begin to perform channel sensing prior to communications. The control node may determine to implement the coexistence mode when the channel sense reports indicate multiple instances of interference or an interference that presents as persistent. The switch between licensed communication mode and coexistence mode may be dynamic or semi-static. Each of the network nodes, including proxy nodes 400-407 and the host network nodes, base stations 105a-105o and any available active UEs, such as UE 115a, continue channel sensing and reporting the results to the control node, base station 105g. If the control node determines that the interference has subsided, it may either dynamically or semi-statically signal the host network nodes, base stations 105a-105o and any available active UEs, such as UE 115a, to resume licensed mode communications, in which all channel sensing for the host network nodes of NR-U network 40 is conducted by proxy nodes 400-407.

It should be noted that channel sensing can be load based or frame based. Additionally, instead of channel sensing for signals, preambles, and the like, channel sensing may be performed using energy detection. While energy detection-based channel sensing may allow for the proxy network to channel sense for the host network nodes, because energy detection does not allow for a more granular identification of the interfering signals, the efficiency and ability to ignore same-operator signals may not be available in such aspects.

In a third optional implementation, base station 105g, as the control node, may signal the host network nodes, base stations 105a-105o and any available active UEs, such as UE 115a, to change network parameters to enable better interference coordination with the interferer network. For example, if the interferer is using a 2 GHz bandwidth and the host network nodes are using a 400 MHz bandwidth, then upon detection of the interferer, base station 105g may signal the host network nodes, base stations 105a-105o and any available active UEs (not shown), to switch to a 2 GHz bandwidth.

In a fourth optional implementation, base station 105g, as the control node, may signal the host network nodes, base stations 105a-105o and any available active UEs, such as UE 115a, proxy nodes 400-407, or the interfering node to initiate one of the other optional modifications depending on the number and the geographic relationship among the proxy nodes observing the interference. For example, if the channel sense report from proxy node 401 is the only report identifying interference from interfering node 409 and the location of interfering node 409 indicates a direction of interference that does not implicate coverage area 41, then base station 105g would determine that the interference does not impact coverage area 41 and, thus, would not signal any modifications. In contrast, if channel sense reports from proxy nodes 405 and 407 each report interference detected at a direction that intersects with coverage area 41, base station 105g may determine that interference exists and signals one of the optional modifications as described herein.

In a fifth optional implementation, base station 105g, as control node, may signal the interferer to move to a different frequency. For example, if channel sense reports from proxy nodes 400, 402, and 403 identify interference from 802.11ad node 408, base station 105g may transmit a request signal to 802.11ad node 408 to change to a different channel or frequency. 802.11ad node 408 may or may not have the capability to execute the request or the capability to signal a response to base station 105g. In such case where 802.11ad node 408 does not signal a response to base station 105g, proxy nodes 400-407 may continue to send channel sense reports to base station 105g. Based on the channel sense results in such reports, base station 105g may determine whether the interference from 802.11ad node 408 persists or goes away. If the interference from 802.11ad node 408 persists, base station 105g may determine to signal one of the other optional modifications described herein in response.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 3A and 3B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. For example, a first aspects includes identifying, by a control node, a first distribution of a plurality of proxy devices around a network operating area of a shared communication spectrum, configuring, by the control node, a plurality of network nodes within the network operating area to conduct communications via the shared communication spectrum without first performing channel sensing on the shared communication spectrum, and configuring, by the control node, the plurality of proxy devices to perform channel sensing on the shared communication spectrum.

A second aspect, based on the first aspect, wherein each proxy device of the plurality of proxy devices is located within the network operating area or within a threshold distance outside of a boundary of the network operating area.

A third aspect, based on the first aspect, wherein the shared communication spectrum is configured within a mmW frequency band.

A fourth aspect, based on the first aspect, wherein each of the plurality of proxy devices is configured to one or more of: detect common interfering nodes of a same radio access technology of the control node and the plurality of network nodes, and detect distinct interfering nodes of a different radio access technology of the control node and the plurality of network nodes.

A fifth aspect, based on the fourth aspect, wherein each of the plurality of proxy devices includes one of: a base station; or a user equipment (UE).

A sixth aspect, based on the fifth aspect, wherein the configuring the plurality of proxy devices includes transmitting a channel sense configuration to each UE of the plurality of proxy devices, wherein the channel sense configuration includes at least a sensing duty cycle within which each UE performs the channel sensing and refrains from transmitting and receiving messages.

A seventh aspect, based on the sixth aspect, further including receiving, at the control node, a capabilities message from each UE of the plurality of proxy devices identifying whether the each UE is capable to detect one or more additional radio access technologies, wherein the channel sense configuration further includes identification of the one or more additional radio access technologies to sense for within the sensing duty cycle.

An eighth aspect, based on the first aspect, wherein the configuring the plurality of proxy devices includes configuring the plurality of proxy devices with a duty cycle for performance of the channel sensing, wherein the duty cycle is one of: a same duty cycle for the plurality of proxy devices or a different duty cycle for each proxy device of the plurality of proxy devices.

A ninth aspect, based on the first aspect, wherein the configuring the plurality of proxy devices includes configuring the plurality of proxy devices to perform the channel sensing for a plurality of radio access technologies, wherein the channel sensing for the plurality of radio access technologies is performed one of simultaneously, according to a time division multiplex sequence, or according to a sensing offset based on a periodicity of known control signals associated with each of the plurality of radio access technologies.

A tenth aspect, based on the first aspect, further including receiving, by the control node, one or more channel sense reports from one or more proxy device of the plurality of proxy devices, wherein at least one channel sense report of the one or more channel sense reports identifies interference from at least one interfering node, and signaling, by the control node, one of the plurality of proxy devices, the plurality of network nodes, or the at least one interfering node, in response to the interference, to modify operations.

An eleventh aspect, based on the tenth aspect, wherein the signaling includes signaling the plurality of proxy devices to increase the performance of the channel sensing on the shared communication spectrum, wherein the increase of the performance includes one of: increase of a frequency of the performance of the channel sensing, or increase of a number of physical channels for the performance of the channel sensing.

A twelfth aspect, based on the eleventh aspect, further including receiving, by the control node, one or more additional channel sense reports identifying continued interference from the at least one interfering node, identifying the continued interference from the at least one interfering node as persistent when the continued interference extends beyond a threshold interference period, and identifying the continued interference from the at least one interfering node as occasional when the continued interference fails to exceed the threshold interference period.

A thirteenth aspect, based on the tenth aspect, wherein the signaling includes signaling the plurality of network nodes to begin performance of the channel sensing on the shared communication spectrum prior to the conduct of the communications, wherein the channel sensing is one of: load-based or frame-based.

A fourteenth aspect, based on the thirteenth aspect, further including receiving, by the control node, one or more additional channel sense reports identifying results of the channel sensing by one or more of: the plurality of proxy devices and the plurality of network nodes, identifying, by the control node, to continue the channel sensing of the plurality of network nodes in response to the results indicating continued interference from the at least one interfering node, and signaling, by the control node, the plurality of network nodes to end the performance of the channel sensing in response to the results indicating no interference detected for a pre-configured period of time.

A fifteenth aspect, based on the tenth aspect, wherein the signaling further includes signaling the plurality of network nodes to apply a modification to one or more network parameters, wherein the modification adjusts the one or more network parameters to accommodate interference coordination with the at least one interfering node.

A sixteenth aspect, based on the tenth aspect, wherein the signaling includes transmitting a request signal to the at least one interfering node, wherein the request signal requests the at least one interfering node to change communication frequencies.

A seventeenth aspect, based on the tenth aspect, further including determining, by the control node, a number of proxy devices of the one or more proxy devices, wherein the signaling is initiated in response to the number of proxy devices exceeding a pre-defined threshold, wherein the signaling includes an indication to selected one or more network nodes of the plurality of network nodes to begin performance of the channel sensing on the shared communication spectrum prior to the conduct of the communications.

An eighteenth aspect including any combination of the first through the seventeenth aspects.

A nineteenth aspect includes receiving, by a proxy node, a sense configuration message from a control node to perform channel sensing on a shared communication spectrum, performing, by the proxy node, the channel sensing on the shared communication spectrum according to network parameters received in the sense configuration message, and transmitting, by the proxy node, a channel sense report including results of the channel sensing.

A twentieth aspect, based on the nineteenth aspect, wherein the proxy node is located within the network operating area or within a threshold distance outside of a boundary of the network operating area.

A twenty-first aspect, based on the nineteenth aspect, wherein the shared communication spectrum is configured within a mmW frequency band.

A twenty-second aspect, based on the nineteenth aspect, wherein the proxy node is configured to one or more of: detect common interfering nodes of a same radio access technology of the control node; and detect distinct interfering nodes of a different radio access technology of the control node.

A twenty-third aspect, based on the twenty-second aspect, wherein the proxy node includes one of: a base station; or a UE.

A twenty-fourth aspect, based on the twenty-third aspect, wherein the proxy node is the UE and wherein the sense configuration message includes at least a sensing duty cycle within which the UE performs the channel sensing and refrains from transmission and reception of messages.

A twenty-fifth aspect, based on the twenty-fourth aspect, further including transmitting, by the proxy node, a capabilities message to the control node identifying whether the UE is capable to detect one or more additional radio access technologies, wherein the channel sense configuration further includes identification of the one or more additional radio access technologies to sense for within the sensing duty cycle.

A twenty-sixth aspect, based on the nineteenth aspect, wherein the sense configuration message includes a duty cycle for performance of the channel sensing.

A twenty-seventh aspect, based on the nineteenth aspect, wherein the sense configuration message includes identification of a plurality of radio access technologies for the proxy node to sense for, wherein the channel sensing for the plurality of radio access technologies is performed by the proxy node one of: simultaneously; according to a time division multiplex sequence; or according to a sensing offset based on a periodicity of known control signals associated with each of the plurality of radio access technologies.

A twenty-eighth aspect, based on the nineteenth aspect, further including obtaining, by the proxy node, a list of host network identifying elements, and ignoring, by the proxy node, all host network signals detected during the channel sensing and identified using the list of the network identifying elements.

A twenty-ninth aspect, based on the nineteenth aspect, further including receiving, by the proxy node, a modification signal from the control node, wherein the modification signal indicates to increase the performance of the channel sensing on the shared communication spectrum, wherein the increase of the performance includes one of: increase of a frequency of the performance of the channel sensing; or increase of a number of physical channels for the performance of the channel sensing.

A thirtieth aspect including any combination of the nineteenth through twenty-ninth aspects.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed by a control node, the method comprising:
   identifying a first distribution of a plurality of proxy devices around a network operating area of a shared communication spectrum;
   configuring a plurality of network nodes within the network operating area to conduct communications via the shared communication spectrum without first performing channel sensing on the shared communication spectrum;
   configuring the plurality of proxy devices to perform the channel sensing on the shared communication spectrum; and
   signaling the plurality of proxy devices to increase how often the plurality of proxy devices performs the channel sensing, the signaling the plurality of proxy devices performed in response to identification of occasional interference on the shared communication spectrum based on one or more channel sense reports, the occasional interference attributable to at least one interfering node.

2. The method of claim 1, wherein each proxy device of the plurality of proxy devices is located within the network operating area or within a threshold distance outside of a boundary of the network operating area.

3. The method of claim 1, wherein the shared communication spectrum is configured within a millimeter wave (mmW) frequency band.

4. The method of claim 1, wherein each of the plurality of proxy devices is configured to one or more of:
   detect common interfering nodes of a same radio access technology of the control node and the plurality of network nodes; and
   detect distinct interfering nodes of a different radio access technology of the control node and the plurality of network nodes.

5. The method of claim 4, wherein each of the plurality of proxy devices includes one of:
   a base station; or
   a user equipment (UE).

6. The method of claim 5, wherein the configuring the plurality of proxy devices includes:
   transmitting a channel sense configuration to each UE of the plurality of proxy devices, wherein the channel sense configuration includes at least a sensing duty cycle within which each UE performs the channel sensing and refrains from transmitting and receiving messages.

7. The method of claim 6, further including:
   receiving a capabilities message from each UE of the plurality of proxy devices identifying whether the each UE is capable to detect one or more additional radio access technologies, wherein the channel sense configuration further includes identification of the one or more additional radio access technologies to sense for within the sensing duty cycle.

8. The method of claim 1, wherein the configuring the plurality of proxy devices includes configuring the plurality of proxy devices with a duty cycle for performance of the channel sensing, wherein the duty cycle is one of: a same duty cycle for the plurality of proxy devices or a different duty cycle for each proxy device of the plurality of proxy devices.

9. The method of claim 1, wherein the configuring the plurality of proxy devices includes configuring the plurality of proxy devices to perform the channel sensing for a plurality of radio access technologies, wherein the channel sensing for the plurality of radio access technologies is performed one of:
   simultaneously;
   according to a time division multiplex sequence; or
   according to a sensing offset based on a periodicity of known control signals associated with each of the plurality of radio access technologies.

10. The method of claim 1, further including:
    receiving the one or more channel sense reports from one or more proxy devices of the plurality of proxy devices, wherein at least one channel sense report of the one or more channel sense reports identifies interference from the at least one interfering node.

11. The method of claim 10, further including:
    receiving one or more additional channel sense reports identifying continued interference from the at least one interfering node;

identifying the continued interference from the at least one interfering node as persistent when the continued interference extends beyond a threshold interference period; and identifying the continued interference from the at least one interfering node as occasional when the continued interference fails to exceed the threshold interference period.

12. The method of claim 10, wherein the signaling includes:
signaling the plurality of network nodes to begin performance of the channel sensing on the shared communication spectrum prior to the conduct of the communications, wherein the channel sensing is one of: load-based or frame-based.

13. The method of claim 12, further including:
receiving one or more additional channel sense reports identifying results of the channel sensing by one or more of: the plurality of proxy devices and the plurality of network nodes;
identifying to continue the channel sensing of the plurality of network nodes in response to the results indicating continued interference from the at least one interfering node; and
signaling the plurality of network nodes to end the performance of the channel sensing in response to the results indicating no interference detected for a pre-configured period of time.

14. The method of claim 10, wherein the signaling further includes:
signaling the plurality of network nodes to apply a modification to one or more network parameters, wherein the modification adjusts the one or more network parameters to accommodate interference coordination with the at least one interfering node.

15. The method of claim 10, wherein the signaling includes:
transmitting a request signal to the at least one interfering node, wherein the request signal requests the at least one interfering node to change communication frequencies.

16. The method of claim 10, further including:
determining a number of proxy devices of the one or more proxy devices, wherein the signaling is initiated in response to the number of proxy devices exceeding a pre-defined threshold,
wherein the signaling includes an indication to selected one or more network nodes of the plurality of network nodes to begin performance of the channel sensing on the shared communication spectrum prior to the conduct of the communications.

17. A method of wireless communication performed by a proxy node, the method comprising:
receiving a sense configuration message from a control node to perform channel sensing on a shared communication spectrum;
performing the channel sensing on the shared communication spectrum according to a network parameter received in the sense configuration message;
transmitting a channel sense report including results of the channel sensing; and
receiving a modification signal from the control node, the modification signal indicating to the proxy node to increase how often the channel sensing is performed, the receiving the modification signal in response to identification, by the control node, of occasional interference on the shared communication spectrum based on one or more channel sense reports received at the control node, the occasional interference attributable to at least one interfering node.

18. The method of claim 17, wherein the proxy node is located within a network operating area or within a threshold distance outside of a boundary of the network operating area.

19. The method of claim 17, wherein the shared communication spectrum is configured within a millimeter wave (mmW) frequency band.

20. The method of claim 17, wherein the proxy node is configured to one or more of:
detect common interfering nodes of a same radio access technology of the control node; and
detect distinct interfering nodes of a different radio access technology of the control node.

21. The method of claim 20, wherein the proxy node includes one of:
a base station; or
a user equipment (UE).

22. The method of claim 21, wherein the proxy node is the UE and wherein the sense configuration message includes at least a sensing duty cycle within which the UE performs the channel sensing and refrains from transmission and reception of messages.

23. The method of claim 22, further including:
transmitting a capabilities message to the control node identifying whether the UE is capable to detect one or more additional radio access technologies, wherein the sense configuration message further includes identification of the one or more additional radio access technologies to sense for within the sensing duty cycle.

24. The method of claim 17, wherein the sense configuration message includes a duty cycle for performance of the channel sensing.

25. The method of claim 17, wherein the sense configuration message includes identification of a plurality of radio access technologies for the proxy node to sense for, wherein the channel sensing for the plurality of radio access technologies is performed by the proxy node one of:
simultaneously;
according to a time division multiplex sequence; or
according to a sensing offset based on a periodicity of known control signals associated with each of the plurality of radio access technologies.

26. The method of claim 17, further including:
obtaining a list of host network identifying elements; and
ignoring all host network signals detected during the channel sensing and identified using the list of the host network identifying elements.

27. An apparatus configured for wireless communication, the apparatus comprising:
one or more processors; and
one or more memories that store processor-executable code and that are coupled to the one or more processors,
wherein the one or more processors are configured to execute the processor-executable code to:
identify, by a control node, a first distribution of a plurality of proxy devices around a network operating area of a shared communication spectrum;
configure, by the control node, a plurality of network nodes within the network operating area to conduct communications via the shared communication spectrum without first performing channel sensing on the shared communication spectrum;

configure, by the control node, the plurality of proxy devices to perform the channel sensing on the shared communication spectrum; and signal the plurality of proxy devices to increase how often the plurality of proxy devices performs the channel sensing, the signaling the plurality of proxy devices performed in response to identification of occasional interference on the shared communication spectrum based on one or more channel sense reports, the occasional interference attributable to at least one interfering node.

28. The apparatus of claim 27, wherein each proxy device of the plurality of proxy devices is located within the network operating area or within a threshold distance outside of a boundary of the network operating area.

29. The apparatus of claim 27, wherein the shared communication spectrum is configured within a millimeter wave (mmW) frequency band.

30. The apparatus of claim 27, wherein each of the plurality of proxy devices is configured to one or more of:
   detect common interfering nodes of a same radio access technology of the control node and the plurality of network nodes; and
   detect distinct interfering nodes of a different radio access technology of the control node and the plurality of network nodes.

31. The apparatus of claim 30, wherein each of the plurality of proxy devices includes one of:
   a base station; or
   a user equipment (UE).

32. The apparatus of claim 31, wherein the one or more processors, when configured to execute the processor-executable code to configure the plurality of proxy devices, are further configured to execute the processor-executable code to transmit a channel sense configuration to each UE of the plurality of proxy devices, wherein the channel sense configuration includes at least a sensing duty cycle within which each UE performs the channel sensing and refrains from transmission and reception of messages.

33. The apparatus of claim 32, wherein the one or more processors are further configured to execute the processor-executable code to receive, at the control node, a capabilities message from each UE of the plurality of proxy devices identifying whether the each UE is capable to detect one or more additional radio access technologies, wherein the channel sense configuration further includes identification of the one or more additional radio access technologies to sense for within the sensing duty cycle.

34. The apparatus of claim 27, wherein the one or more processors, when configured to execute the processor-executable code to configure the plurality of proxy devices, are further configured to execute the processor-executable code to configure the plurality of proxy devices with a duty cycle for performance of the channel sensing, wherein the duty cycle is one of: a same duty cycle for the plurality of proxy devices or a different duty cycle for each proxy device of the plurality of proxy devices.

35. The apparatus of claim 27, wherein the one or more processors, when configured to execute the processor-executable code to configure the plurality of proxy devices, are further configured to execute the processor-executable code to configure the plurality of proxy devices to perform the channel sensing for a plurality of radio access technologies, wherein the channel sensing for the plurality of radio access technologies is performed one of:
   simultaneously;
   according to a time division multiplex sequence; or
   according to a sensing offset based on a periodicity of known control signals associated with each of the plurality of radio access technologies.

36. The apparatus of claim 27, wherein the one or more processors are further configured to execute the processor-executable code to:
   receive, by the control node, the one or more channel sense reports from one or more proxy devices of the plurality of proxy devices, wherein at least one channel sense report of the one or more channel sense reports identifies interference from the at least one interfering node.

37. The apparatus of claim 36, wherein the one or more processors are further configured to execute the processor-executable code to:
   receive, by the control node, one or more additional channel sense reports identifying continued interference from the at least one interfering node;
   identify the continued interference from the at least one interfering node as persistent when the continued interference extends beyond a threshold interference period; and
   identify the continued interference from the at least one interfering node as occasional when the continued interference fails to exceed the threshold interference period.

38. The apparatus of claim 36, wherein the one or more processors, when configured to execute the processor-executable code to signal, are further configured to execute the processor-executable code to signal the plurality of network nodes to begin performance of the channel sensing on the shared communication spectrum prior to the conduct of the communications, wherein the channel sensing is one of: load-based or frame-based.

39. The apparatus of claim 38, wherein the one or more processors are further configured to execute the processor-executable code to:
   receive, by the control node, one or more additional channel sense reports identifying results of the channel sensing by one or more of: the plurality of proxy devices and the plurality of network nodes;
   identify, by the control node, to continue the channel sensing of the plurality of network nodes in response to the results indicating continued interference from the at least one interfering node; and
   signal, by the control node, the plurality of network nodes to end the performance of the channel sensing in response to the results indicating no interference detected for a pre-configured period of time.

40. The apparatus of claim 36, wherein the one or more processors, when configured to execute the processor-executable code to signal, are further configured to execute the processor-executable code to signal the plurality of network nodes to apply a modification to one or more network parameters, wherein the modification adjusts the one or more network parameters to accommodate interference coordination with the at least one interfering node.

41. The apparatus of claim 36, wherein the one or more processors, when configured to execute the processor-executable code to signal, are further configured to execute the processor-executable code to transmit a request signal to the at least one interfering node, wherein the request signal requests the at least one interfering node to change communication frequencies.

42. The apparatus of claim 36, wherein the one or more processors are further configured to execute the processor-executable code to:

determine, by the control node, a number of proxy devices of the one or more proxy devices, wherein to signal the plurality of proxy devices to increase a frequency associated with the channel sensing, the one or more processors are further configured to execute the processor-executable code in response to the number of proxy devices exceeding a pre-defined threshold, wherein to signal the plurality of proxy devices to increase the frequency associated with the channel sensing, the one or more processors are further configured to execute the processor-executable code to include an indication to selected one or more network nodes of the plurality of network nodes to begin performance of the channel sensing on the shared communication spectrum prior to the conduct of the communications.

43. An apparatus configured for wireless communication, the apparatus comprising:

one or more processors; and one or more memories that store processor-executable code and that are coupled to the one or more processors, wherein the one or more processors are configured to execute the processor-executable code to:

receive, by a proxy node, a sense configuration message from a control node to perform channel sensing on a shared communication spectrum;

perform, by the proxy node, the channel sensing on the shared communication spectrum according to a network parameter received in the sense configuration message;

transmit, by the proxy node, a channel sense report including results of the channel sensing; and receive, by the proxy node, a modification signal from the control node, the modification signal indicating to the proxy node to increase how often the channel sensing is performed, the receipt of the modification signal in response to identification, by the control node, of occasional interference on the shared communication spectrum based on one or more channel sense reports received at the control node, the occasional interference attributable to at least one interfering node.

44. The apparatus of claim 43, wherein the proxy node is located within a network operating area or within a threshold distance outside of a boundary of the network operating area.

45. The apparatus of claim 43, wherein the shared communication spectrum is configured within a millimeter wave (mmW) frequency band.

46. The apparatus of claim 43, wherein the proxy node is configured to one or more of:

detect common interfering nodes of a same radio access technology of the control node; and detect distinct interfering nodes of a different radio access technology of the control node.

47. The apparatus of claim 46, wherein the proxy node includes one of:

a base station; or a user equipment (UE).

48. The apparatus of claim 47, wherein the proxy node is the UE and wherein the sense configuration message includes at least a sensing duty cycle within which the UE performs the channel sensing and refrains from transmission and reception of messages.

49. The apparatus of claim 48, wherein the one or more processors are further configured to execute the processor-executable code to transmit, by the proxy node, a capabilities message to the control node identifying whether the UE is capable to detect one or more additional radio access technologies, wherein the sense configuration message further includes identification of the one or more additional radio access technologies to sense for within the sensing duty cycle.

50. The apparatus of claim 43, wherein the sense configuration message includes a duty cycle for performance of the channel sensing.

51. The apparatus of claim 43, wherein the sense configuration message includes identification of a plurality of radio access technologies for the proxy node to sense for, wherein the channel sensing for the plurality of radio access technologies is performed by the proxy node one of:

simultaneously;

according to a time division multiplex sequence; or according to a sensing offset based on a periodicity of known control signals associated with each of the plurality of radio access technologies.

52. The apparatus of claim 43, wherein the one or more processors are further configured to execute the processor-executable code to:

obtain, by the proxy node, a list of host network identifying elements; and ignore, by the proxy node, all host network signals detected during the channel sensing and identified using the list of the host network identifying elements.

* * * * *